(12) United States Patent
Allen et al.

(10) Patent No.: US 8,700,437 B2
(45) Date of Patent: Apr. 15, 2014

(54) ANALYZING OPERATIONAL RESULTS USING RULE-BASED POLICY MODELS

(75) Inventors: Mark Allen, Menlo Park, CA (US); Pedram Abrari, Redwood Shores, CA (US); David Straus, Los Altos, CA (US)

(73) Assignee: Progress Software Corporation, Bedford, MA (US)

( * ) Notice: Subject to any disclaimer, the term of this patent is extended or adjusted under 35 U.S.C. 154(b) by 1413 days.

(21) Appl. No.: 11/248,032

(22) Filed: Oct. 11, 2005

(65) Prior Publication Data

US 2007/0083407 A1   Apr. 12, 2007

(51) Int. Cl.
*G06Q 10/00* (2012.01)

(52) U.S. Cl.
USPC ........................................................ 705/7.11

(58) Field of Classification Search
USPC ........................................................ 705/7.11
See application file for complete search history.

(56) References Cited

U.S. PATENT DOCUMENTS

| | | | | |
|---|---|---|---|---|
| 6,983,266 | B1 * | 1/2006 | Goldschmidt | 706/52 |
| 7,937,281 | B2 * | 5/2011 | Miller et al. | 705/7.11 |
| 2004/0030566 | A1 * | 2/2004 | Brooks Rix | 705/1 |
| 2004/0230404 | A1 | 11/2004 | Messmer et al. | |
| 2005/0021348 | A1 | 1/2005 | Chan et al. | |
| 2005/0096950 | A1 * | 5/2005 | Caplan et al. | 705/7 |
| 2005/0165822 | A1 * | 7/2005 | Yeung et al. | 707/102 |
| 2005/0187809 | A1 * | 8/2005 | Falkenhainer | 705/9 |
| 2006/0184410 | A1 * | 8/2006 | Ramamurthy et al. | 705/8 |
| 2007/0006177 | A1 * | 1/2007 | Aiber et al. | 717/136 |
| 2008/0208659 | A1 * | 8/2008 | An et al. | 705/7 |

OTHER PUBLICATIONS

Yasu Technologies. QuickRules Analytics. [online], [retrieved on Sep. 28, 2005]. Retrieved from the Internet: <URL: http://www.yasutech.com/products/analytics/index.htm>.
Yasu Technologies. Why Rule Analytics? [online], [retrieved on Sep. 28, 2005]. Retrieved from the Internet: <URL: http://www.yasutech.com/products/analytics/WhyRuleAnalytics.htm>.
Yasu Technologies. Frequently Asked Questions. [online], [retrived on Sep. 28, 2005]. Retrieved from the Internet: <URL: http://www.yasutech.com/products/quickrules/faq.htm>.
Yasu Technologies. Application Developer Manual QuickRules 3.0. [online], [retrieved on Sep. 28, 2005]. Retrieved from the Internet: <URL: http://www.yasutech.com/docs/quickrules/developer/OuickRules_AppDevManual.pdf>.
Corticon Technologies, Inc. et al., International Search Report and the Written Opinion of the PCT Application No. PCT/US2006/07385 filed Mar. 1, 2006, received Jan. 23, 2007, 8 pages.

* cited by examiner

*Primary Examiner* — Mark A Fleischer
(74) *Attorney, Agent, or Firm* — Patent Law Works LLP

(57) ABSTRACT

Methods, systems, and products that execute modeled business controls on a modeled input work item to generate a corresponding modeled output work item. Input data values included in the modeled input work item either match or approximate corresponding values included in a corresponding actual input work item. Each modeled business control is defined by business rules that represent a business policy, and the business rules and the input data values of the modeled input work item are used to generate the modeled output work item. An actual output work item from a business process is compared to the modeled output work item. The actual output work item includes actual output data values. The business process changes the actual input work item into the actual output work item. The modeled output work item includes modeled output data values. Differences between the actual and modeled output work items are reported.

28 Claims, 5 Drawing Sheets

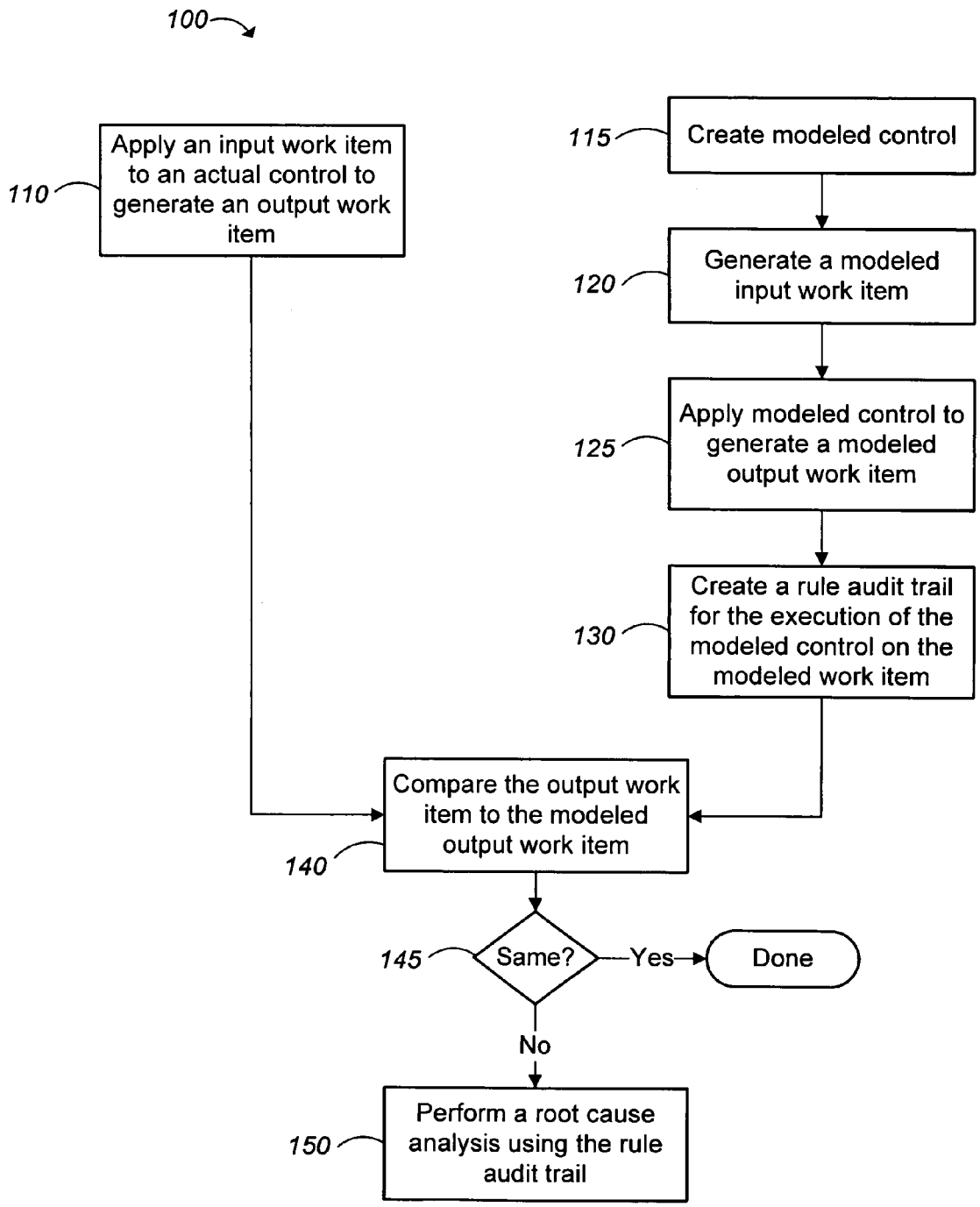
FIG._1

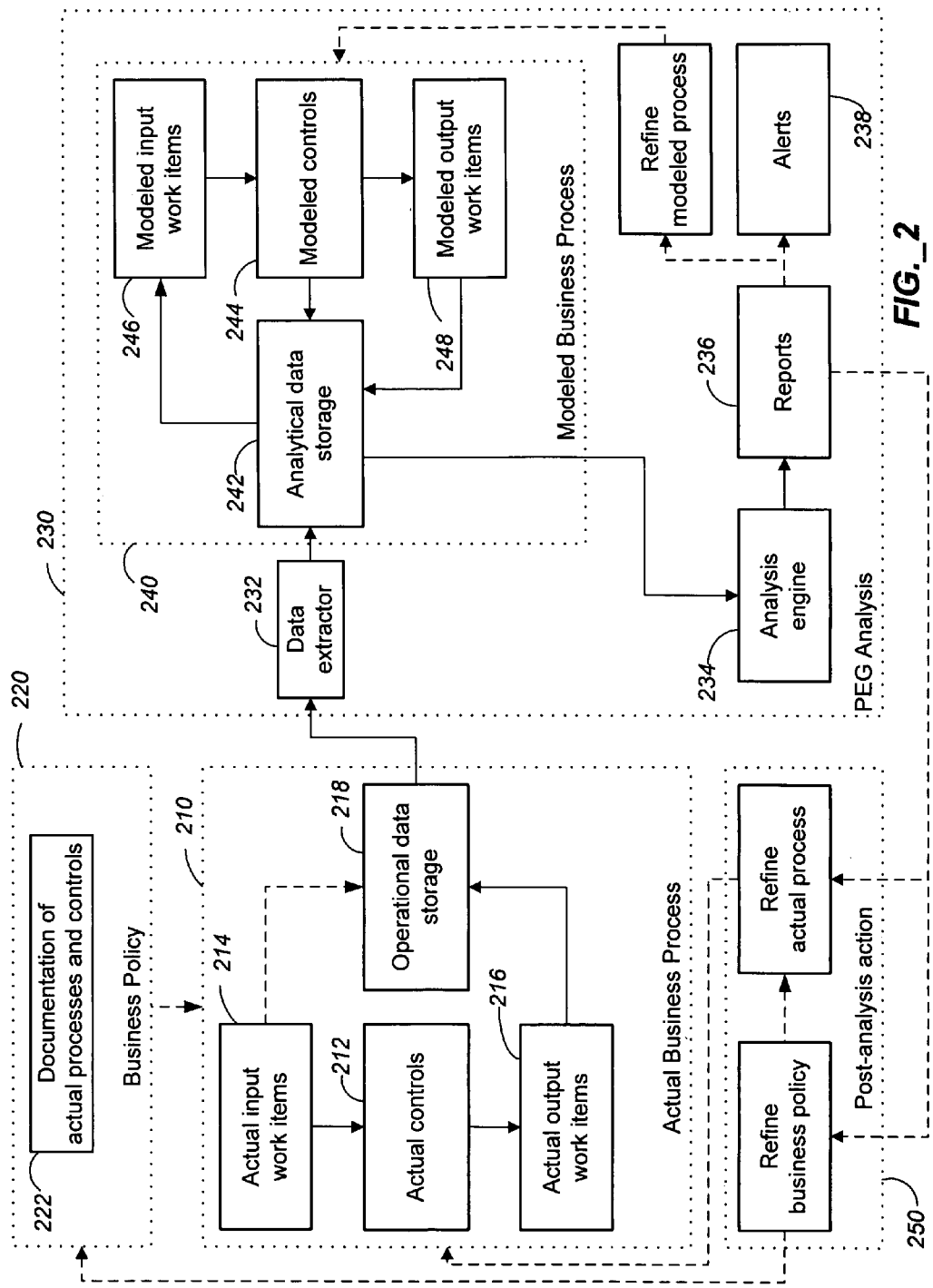
FIG._2

Aggregate Analysis - Details

ORDER (310)

| ID | customerID | date | total | credit_approved |
|---|---|---|---|---|
| 1 | 1 | 1/1/2005 | 5,000 | T |
| 2 | 2 | 1/1/2005 | 5,000 | F |
| 3 | 3 | 1/1/2005 | 5,000 | T — 312 |
| 4 | 3 | 1/1/2005 | 10,000 | T — 314 |
| 5 | 10 | 1/1/2005 | 5,000 | T — 316 |

CUSTOMER (320)

| ID | available_credit | avg_DSOs | credit_limit | credit_outstanding | dB_rating |
|---|---|---|---|---|---|
| 1 | 9,000 | 20 | 10,000 | 1,000 | 1 |
| 2 | 9,000 | 20 | 10,000 | 1,000 | 5 |
| 3 | 5,000 | 90 | 10,000 | 5,000 | 1 |
| 10 | 10,000 — 322 | 90 | 10,000 | 15,000 | 2 |

ORDER_PEG (330)

| ID | customerID | date | total | credit_approved |
|---|---|---|---|---|
| 1 | 1 | 1/1/2005 | 5,000 | T |
| 2 | 2 | 1/1/2005 | 5,000 | F |
| 3 | 3 | 1/1/2005 | 5,000 | T — 332 |
| 4 | 3 | 1/1/2005 | 10,000 | T — 334 |
| 5 | 10 | 1/1/2005 | 5,000 | F — 336 |

CUSTOMER_PEG (340)

| ID | available_credit | avg_DSOs | credit_limit | credit_outstanding | dB_rating |
|---|---|---|---|---|---|
| 1 | 9,000 | 20 | 10,000 | 1,000 | 1 |
| 2 | 9,000 | 20 | 10,000 | 1,000 | 5 |
| 3 | 5,000 | 90 | 10,000 | 5,000 | 1 |
| 10 | (5,000) — 342 | 90 | 10,000 | 15,000 | 2 |

FIG._3

Root Cause Analysis

Order: 3

| RuleID | RuleStatement | | |
|---|---|---|---|
| 3 | If customer has a positive D&B rating (1-3), and average DSOs >=30, then approve credit for orders not exceeding available credit. — 410 | | |
| | Output | Predicted | Actual |
| | Order.credit_approved | T | F — 420 |
| | Input | Predicted | Actual |
| | Order.customer.dB_Rating | 1 | 1 |
| | Order.customer.avg_DSOs | 90 | 90 |
| | Order.total | 5,000 | 5,000 — 415 |
| | Order.customer.available_credit | 5,000 | 5,000 |

Order: 4

| RuleID | RuleStatement | | |
|---|---|---|---|
| 4 | If order total exceeds customer's available credit, then deny credit on the order. | | |
| | Output | Predicted | Actual |
| | Order.credit_approved | F | T |
| | Input | Predicted | Actual |
| | Order.total | 10,000 | 10,000 |
| | Order.customer.available_credit | 5,000 | 5,000 |

Order: 5

| RuleID | RuleStatement | | |
|---|---|---|---|
| N-1 | Company's available credit is equal to credit limit minus credit outstanding — 440 | | |
| | Output | Predicted | Actual |
| | Company.available_credit | (5,000) | 10,000 — 442 |
| | Input | Predicted | Actual |
| | Company.credit_limit | 10,000 | 10,000 |
| | Company.credit_outstanding | 15,000 | 15,000 — 444 |
| 4 | If order total exceeds customer's available credit, then deny credit on the order. | | |
| | Output | Predicted | Actual |
| | Order.credit_approved | F | T — 432 |
| | Input | Predicted | Actual |
| | Order.total | 5,000 | 5,000 — 434 |
| | Order.customer.available_credit | (5,000) | 10,000 |

| | Root Cause Analysis | | | | | |
|---|---|---|---|---|---|---|
| | Order: 5742B | | | | | |
| | RuleID | RuleStatement | | | | |
| 510 | 8790 | An order equals the sum of its line items. | | | | |
| | | Output | Policy | Actual | Difference | Savings |
| | | Order.total  512 | $ 86,798 | $ 108,398 | $ (21,600) | 20% |
| | | | 514 | | | |
| | | Input | Policy | Actual | Difference | Savings |
| | | Order.lineitem.subtotal | $ 34,719 | $ 43,359 | $ (8,640) | 20% |
| | | Order.lineitem.subtotal | $ 32,115 | $ 45,075 | $ (12,960) | 29% |
| | | Order.lineitem.subtotal | $ 19,964 | $ 19,964 | $ - | 0% |
| 530 | 7649 | Ordered non-contracted product has been replaced by 'Exact or Functional Equivalent' product | | | | |
| | | Output | Policy | Actual | Difference | Savings |
| | | Order.lineitem.subtotal  532 | $ 34,719 | $ 43,359 | $ (8,640) | 20% |
| | | | | | | |
| | | Input  534 | Policy | Actual | Difference | Savings |
| | | Order.lineitem.onContract | F | | | |
| | | Order.lineitem.subtotal | $ 43,359 | $ 43,359 | $ - | 0% |
| | | Order.lineitem.product.iD | 784-GIE | | | |
| | | Order.lineitem.product.refProduct | 784-GIE | | | |
| | | Order.lineitem.substituteFlag | T | | | |
| 550 | 7650 | Ordered non-contracted product has been replaced by 'Exact' product. | | | | |
| | | Output | Policy | Actual | Difference | Savings |
| | | Order.lineitem.subtotal  552 | $ 32,115 | $ 45,075 | $ (12,960) | 29% |
| | | | | | | |
| | | Input  554 | Policy | Actual | Difference | Savings |
| | | Order.lineitem.onContract | F | | | |
| | | Order.lineitem.subtotal | $ 45,075 | $ 45,075 | $ - | 0% |
| | | Order.lineitem.product.iD | 169-OJF | | | |
| | | Order.lineitem.product.refProduct | 169-OJF | | | |
| | | Order.lineitem.substituteFlag | T | | | |
| 570 | 7648 | Product on contract, no substitution allowed. | | | | |
| | | Output | Policy | Actual | Difference | Savings |
| | | Order.lineitem.subtotal | $ 19,964 | $ 19,964 | $ - | 0% |
| | | | | | | |
| | | Input | Policy | Actual | Difference | Savings |
| | | Order.lineitem.onContract | T | | | |
| | | Order.lineitem.subtotal | $ 19,964 | $ 19,964 | $ - | 0% |
| | | Order.lineitem.product.iD | 256-IOJ | | | |
| | | Order.lineitem.product.refProduct | 256-IOJ | | | |
| | | Order.lineitem.substituteFlag | F | | | |

ANALYZING OPERATIONAL RESULTS USING RULE-BASED POLICY MODELS

BACKGROUND

The present invention relates to the rule-based modeling of policy, and the use of modeled policy to analyze operational results.

Operational results are the outputs produced by business processes (e.g., bills produced by a billing process; payments produced by a claims process; reports produced by a financial reporting process). In performing processes, people and systems transform inputs into operational results.

Processes are generally governed by business policies that define the set of rules used to transform inputs into operational results. Policies can derive from many sources, including management (e.g., best practices), trading partners (e.g., contracts and service level agreements), and regulatory bodies (e.g., statutes). Adherence to policy is necessary to ensure optimal business outcomes and/or to comply with contract or law.

Organizations sometimes have trouble clearly defining and enforcing policy, and thus are subject to suboptimal operational results and/or risk of non-compliance. In addition, organizations face the challenge of changing policies and understanding the impact of policy change. This includes the need to keep existing policies current as well as to continuously design new, better policies.

SUMMARY

This specification describes systems and processes used to analyze operational (that is, actual) results using modeled policy and to quantitatively measure discrepancies between the actual results and results predicted by the modeled policy.

In one aspect, the invention features a system that includes an analysis engine which compares one or more actual output work items from an actual business process to one or more modeled output work items from a modeled business process and reports differences between them. Each actual output work item includes one or more actual output data values, and the actual business process changes an actual input work item into the actual output work item. Each modeled output work item includes one or more modeled output data values, and the modeled business process operates on one or more modeled input work items and generates the one or more modeled output work items. Input data values included in each modeled input work item either match or approximate corresponding values included in a corresponding actual input work item. The modeled business process includes one or more modeled business controls, each of which corresponds to an actual business control in the actual business process. Each modeled business control is defined by a set of business rules that represent a business policy. The analysis engine uses the set of business rules to generate the one or more modeled output work items using the input data values of the one or more modeled input work items.

Particular implementations can include one or more of the following features. The analysis engine creates a rule audit trail that records, for an individual modeled output work item, a sequence of modeled business controls that executed on an individual modeled input work item. The rule audit trail also records a sequence of associated business rules that fired within the modeled business controls to generate the individual modeled output work item. The rule audit trail also records a set of data values input to each business rule that fired and a set of data values output from each business rule that fired. The analysis engine uses the rule audit trail to identify one or more root causes for any difference between the individual modeled output work item and a corresponding actual output work item, where each root cause is a business rule. The analysis engine compares the one or more actual output work items and the one or more modeled output work items in near real-time and generates an alert if a difference is found. The analysis engine aggregates results of comparing the one or more actual output work items and the one or more modeled output work items to report the differences.

The analysis engine generates an alert when a discrepant work item occurs. The analysis engine compares the one or more actual output work items to one or more updated modeled output work items from one or more updated modeled business controls and reports a change caused by using the one or more updated modeled business controls in place of the one or more modeled business controls. An analytical data storage database stores each modeled input work item and each modeled output work item. The analytical data storage database is constructed automatically based upon a data model used to define the one or more modeled business controls. A data model is used to construct the one or more modeled business controls, and the data model is constructed automatically based upon an operational data model used within an operational data storage that stores each actual output work item and each actual input work item.

The analysis engine is operable to generate an alert if the set of business rules that defines one of the modeled business controls is incomplete or inconsistent. The analysis engine generates an alert if one of the actual output work items does not include any actual output data value that corresponds to a modeled output data value included in one of the modeled output work items.

In another aspect, the invention features a system that includes means for comparing one or more actual output work items from an actual business process to one or more modeled output work items from a modeled business process. The system also includes means for reporting differences between the one or more actual output work items and the one or more modeled output work items. Each actual output work item includes one or more actual output data values, and the actual business process changes an actual input work item into the actual output work item. Each modeled output work item includes one or more modeled output data values, and the modeled business process operates on a modeled input work item and generates a corresponding modeled output work item. Input data values included in each modeled input work item either match or approximate corresponding values included in a corresponding actual input work item. The modeled business process includes one or more modeled business controls, each of which corresponds to an actual business control in the actual business process. Each modeled business control is defined by a set of business rules that represent a business policy, and the means for comparing uses the set of business rules to generate the modeled output work item using the input data values of the modeled input work item.

In yet another aspect, the invention features a method and a computer program product that executes a modeled business process consisting of one or more modeled business controls on a modeled input work item to generate a corresponding modeled output work item. Input data values included in the modeled input work item either match or approximate corresponding values included in a corresponding actual input work item. Each modeled business control is defined by a set of business rules that represent a business policy, and executing the one or more modeled business controls includes using the set of business rules and the input data values of the modeled input work item to generate the modeled output work item. An actual output work item from an actual business process is compared to the modeled output work item. The actual output work item includes one or more actual output data values. The actual business process changes the actual input work item into the actual output work item. The modeled output work item includes one or more modeled output data values. Differences between the actual output work item and the modeled output work item are reported.

Particular implementations can include one or more of the following features. A rule audit trail is created that records, for the modeled output work item, a sequence of the modeled business controls that executed on the modeled input work item and a sequence of the business rules that fired within the modeled business controls to generate the modeled output work item. A set of data values input to each business rule that fired and a set of data values output from each business rule that fired are recorded. The rule audit trail is used to identify one or more root causes, where each root cause is a business rule that causes a difference between the individual modeled output work item and the actual output work item. The actual output work item is compared to an updated modeled output work item from one or more updated modeled business controls, and a change caused by using the one or more updated modeled business controls in place of the one or more modeled business controls is reported. The set of business rules is created by modeling logic of the business policy.

In another aspect, the invention features a system for comparing outputs of internal business controls to outputs of business controls modeling a policy. An analysis engine compares one or more actual output work items from one or more actual business controls in an actual business process to one or more modeled output work items from one or more modeled business controls. Each actual output work item includes a set of variables, where each variable stores one or more values. The one or more actual business controls execute on and change an actual input work item into the actual output work item. Each modeled output work item includes a set of variables, where each variable stores one or more values. The one or more modeled business controls execute on and change a modeled input work item into the modeled output work item. Each actual business control is executed by an existing system or manually by one or more people, and each modeled business control is executed by a rule engine. Each modeled business control includes a set of business rules that describe a desired logic for the modeled business control, and the set of business rules transform the modeled input work item into the modeled output work item. Each business rule in the set of business rules is associated with a policy source and a motivation, and each modeled input work item is extracted from operational data stores that store the one or more actual output work items. Each modeled input work item is either a copy of a corresponding actual input work item or an approximation of the corresponding actual input work item. The one or more modeled business controls each fire one or more business rules from the set of business rules included in the respective modeled business control. The analysis engine creates a rule audit trail and stores the rule audit trail in an analytical data store, where the rule audit trail records, for an individual modeled output work item, a sequence of modeled business controls and associated business rules that fired against a corresponding modeled input work item, and a set of variable inputs to each business rule that fired, and a set of variable outputs from each business rule that fired. The analysis engine uses the rule audit trails to identify any differences between the actual output work items and corresponding modeled output work items. For any difference between the actual output work items and the corresponding modeled output work items, the analysis engine uses the rule audit trails to identify a root cause and generates reports.

Particular implementations can include one or more of the following features. The desired logic for each modeled business control is derived from the policy, where the policy is an existing policy. Any differences between the actual output work items and the corresponding modeled output work items are discrepancies between the policy and an execution of the policy. Alternatively, the desired logic for each modeled business control is derived from the policy, where the policy is a proposed new policy. Any differences between the actual output work items and the corresponding modeled output work items reflect the effects of changing from an existing policy to the proposed new policy.

The systems and processes help organizations understand their existing policies and assess whether their operational results, and the processes used to generate their operational results, are in compliance with their existing policies. In addition, the systems and processes can be used to analyze the expected impact of policy changes on operational results. The systems and processes can be used to analyze the impact of changing market conditions on operational results, in consideration of current or new policies. This helps organizations plan for best and worst-case scenarios, and have policies ready for deployment if such scenarios arise.

The invention can be implemented to realize one or more of the following advantages. The logic used within the analysis is clearly exposed, such that the analysis results can be understood and verified by the same non-technical personnel who understand the policies. The analysis is performed with greater speed and ease than other methods. The policy model used within the analysis can be used to automate policy enforcement in high-throughput transaction processing systems without requiring recoding or recompilation of logic.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a flowchart of a process for analyzing a business process.

FIG. 2 is a block diagram of a system for analyzing a business process.

FIG. 3 shows part of an analysis report that includes actual data and modeled data.

FIGS. 4 and 5 show a root-cause analysis.

Like reference numbers and designations in the various drawings indicate like elements.

DETAILED DESCRIPTION

In business processes, people and systems ("participants") transform inputs ("input work items") into operational results ("output work items"). While work items often consist of physical materials (e.g., a car, a 100-page contract, etc.), they can be represented as a set of variables for the purposes of information processing, where each variable stores one or more values (e.g., the price of an item, an interest rate for a loan, the origin of an order, etc.).

A business process can be modeled as a sequence of steps ("tasks"), with each step taking zero or more input work items and producing one or more output work items. Tasks are performed by participants. At the most atomic level, tasks are either purely mechanical in nature or purely logical in nature. In performing mechanical tasks, participants perform actions—for example, painting a car, printing a document, or retrieving a record. In performing logical tasks, participants determine what actions to perform (or what actions not to perform)—for example, determining which color to paint a car, determining which document to print, or determining which record to retrieve. In addition, logical tasks can act as quality controls to assess whether one or more mechanical tasks have produced the desired operational results—for example, determining whether two or more finance managers have signed a check over $10,000. Logical tasks are referred to synonymously as "decision points," "business controls," or "controls."

Processes are governed by business policies ("policies"). Logically, a policy can be described as a set of business rules ("rules"). Rules, as defined by the GUIDE Business Rules Project, are statements that define or constrain some aspect of the business. A rule is intended to assert business structure, or to control or influence the behavior of the business. For example, a revenue recognition policy might be described by rules such as "An order must be shipped to customer by the last business day of quarter to qualify as revenue."

Rules, the atomic units of policy, are enforced within business controls. For example, a loan origination process may be governed by a policy defining what products and rates to offer new loan customers. The loan origination process may consist of the following tasks in sequential order: (1) a customer fills out a loan application, (2) a broker determines what products and rates to offer the customer, (3) the broker explains the products and rates to the customer, and (4) the customer selects a product. Tasks 1, 3, and 4 are mechanical tasks, while task 2 is a business control. As an example, task 2 could include a rule that states, "Applicants with good credit are eligible for home equity lines of up to 90% of collateral value."

As shown in FIG. 1, a process 100 is used to analyze or monitor the operation of business controls in an existing business process. The business controls to be analyzed may be performed by people or by systems—for example, by an enterprise software application. A work item is input to an actual control in the business process (step 110), and the actual control is applied to the input work item to transform it into an output work item.

In order to analyze or monitor the business process, a modeled control is created (step 115) that corresponds to a desired behavior of the actual control from the business process. The modeled control is modeled using a set of business rules that logically describe the desired behavior, which typically is codified in a business policy. A rule engine is used to model the control. A suitable rule engine is described in U.S. patent application Ser. No. 09/994,477, filed Nov. 26, 2001 and in U.S. patent application Ser. No. 10/639,674, filed Aug. 11, 2003, both of which are hereby incorporated by reference in their entirety.

A modeled input work item is generated (step 120). The work item that was input to the actual control is used as the modeled input work item if the work item is available (e.g., if the work item was stored before being transformed into the output work item). If the work item is not available, but the output work item includes the information that was input to the actual control, the output work item is used to generate a modeled input work item that approximates the work item. The modeled control is applied to the modeled input work item (step 125), and the modeled control transforms the modeled input work item into a modeled output work item.

As the modeled control executes on the modeled input work item, a rule audit trail is created (step 130) that records which rules from the modeled control fired against (that is, were applied to) the modeled input work item, as well as the order in which the rules fired. In addition, the rule audit trail records the values of all variables used as input to the rules and created as output from the rules.

The output work item from the actual business control is compared to the modeled output work item (step 140). If the output work item differs from the modeled output work item, an analysis engine uses the rule audit trail to determine which rule or rules in the modeled control were the root causes of the differences (step 150). Once the root causes are determined, the actual control is changed, if necessary, to align the actual behavior of the business process more closely with the desired behavior, as will be discussed in more detail below.

As shown in FIG. 2, a business process 210 includes actual controls 212 derived from a business policy 220. The business policy 220 specifies how business processes and controls should operate and typically includes documentation 222 codifying the business processes and controls. The actual controls 212 are performed by people (e.g., a company officer signing a check to indicate approval), by automated processes (e.g., software determining a loan rate based on a credit rating and a loan amount), or by a combination of the two. The actual controls 212 transform actual input work items 214 into actual output work items 216. The actual output work items 216 are stored in operational data storage 218 (e.g., a relational database). In one implementation, the actual input work items 214 also are stored in the operational data storage 218.

In order to analyze and monitor how closely the business process 210 adheres to the underlying business policy 220, data from the operational data storage 218 is analyzed by a system and process that will be referred to as a discrepancy analysis 230. An example of a discrepancy analysis is a "Policy-Execution Gap Analysis," also called a "PEG Analysis," both of which are trademarks of Corticon Technologies, Inc. of San Mateo, Calif. The discrepancy analysis 230 uses a data extractor 232 to extract data from the operational data storage 218 and place the data into analytical data storage 242. The extracted data in the analytical data storage 242 is used in a modeled business process 240. The modeled business process 240 includes modeled controls 244, which transform modeled input work items 246 into modeled output work items 248. The modeled output work items 248 are also stored in the analytical data storage 242. In one implementation, the data model used to define the modeled controls 244 is identical to the data model used in the operational data storage 218. For example, the data model used to define the modeled controls 244 can be generated automatically based on the data model used in the operational data storage 218, and the analytical data storage 242 can be generated automatically based on the data model used to define the modeled controls 244. When the data models for the modeled controls 244 and the operational data storage 218 are identical, the data extractor 232 need only copy data from the operational data storage 218 to the analytical data storage 242. In another implementation, the data model used in the operational data storage 218 differs from the data model used to define the modeled controls 244, and the data extractor 232 must transform the data from the operational data storage 218 into a form that is compatible with the data model used to define the modeled controls 244. Thus, the data extractor 232 can be an extract, transform, load (ETL) software tool that can optionally transform (reformat) the data from the operational storage 218 before placing it into the analytical data storage 242.

The modeled input work items 246 correspond to the actual input work items 214. If the actual input work items 214 are stored in the operational data storage 218, each of the modeled work items 246 contains data from a corresponding one of the actual input work items 214 reformatted by the data extractor 232 into a format suitable for input to the modeled controls 244. In some systems, not all of the data from the actual input work items 214 is needed by the discrepancy analysis 230, so the modeled work items 246 may contain a subset of the data contained in the actual input work items 214. If the actual input work items 214 are not stored in the operational data storage 218, but the actual output work items 216 include the data on which the actual controls 212 operated, the actual output work items 216 are used as the modeled input work items 246, which then approximate the actual input work items 214.

The modeled controls 244 can be represented as a set of business rules that are defined within the business policy 220 (or within a proposed business policy that differs from business policy 220). The rules may be represented in a form similar to that described in the patent applications incorporated by reference above or in other forms suitable for processing by a rule engine. Each of the modeled controls 244 is automated by a rule engine and corresponds to a portion of the business process 210. Each of the modeled controls 244 implement rules that are applied to the modeled input work items 246 to transform the modeled input work items 246 into the modeled output work items 248. The rules can be derived from the business policy 220 and model a desired behavior of the actual controls 212. Each rule included in the modeled controls 244 can be documented as being associated with a policy source from the business policy 220 and with a motivation, thus maintaining business context and traceability for the rule.

Any portion of the business process 210 involving business controls can be modeled using the modeled controls 244 and analyzed. For business process 210 to be analyzed, appropriate data about the actual output work items 216 must be stored in the operational data storage 218. For example, if a control in the business process 210 is performed by a human, as is the case when a check is signed, information about execution of the control, such as the state of the signature on the check (e.g., "signed" or "unsigned"), the signatory (e.g., "Joe Smith"), and the amount (e.g., "$1,000"), typically is stored in the operational data storage 218 as part of the work items output from the human-performed control. When attempting to use the discrepancy analysis 230, it may be determined that some portion of the business process 210 cannot be analyzed because necessary data is not being stored in the operational data storage 218. If this is the case, the business process 210 typically can be modified so that the necessary information is stored.

When the modeled controls 244 are executed on a modeled input work item, a rule audit trail is stored in the analytical data storage 242. The rule audit trail records the sequence in which the modeled controls 244 execute, which rules fire on the modeled input work item, and the order in which the rules fire. In addition, the rule audit trail records the input to, and the output from, each rule that fires on the modeled input work item.

An analysis engine 234 compares the actual output work items 216 that are extracted to the analytical data storage 242 to the modeled output work items 248 to identify any differences between them. Any difference is referred to as a discrepant work item and indicates a discrepancy between policy and operation: a difference between an actual result and a result predicted by modeled controls. When the modeled controls 244 accurately represent the business policy 220 and the modeled input work items accurately represent the actual input work items, discrepant work items are caused by one or both of: (1) incorrect execution (i.e., failure to comply with policy); and (2) incorrect policy. Determination of source requires the judgment of a subject matter expert ("SME").

Incorrect execution is the problem when, in the judgment of the SME, the rules that fired on the modeled input work items 246 to produce the modeled output work items 248 were correct. In this case, it can be inferred that the actual controls 212 failed to apply the rules properly, and thus failed to comply with business policy 220. When incorrect execution is the problem, the actual controls 212 should be modified to perform in a manner that is compliant with the business policy 220.

Incorrect policy is the problem when, in the judgment of the SME, the rules that fired on the modeled input work items 246 to produce the modeled output work items 248 were incorrect. In other words, the business policy 220 is wrong and should be changed.

If the actual input work items 214 are not stored in the operational data storage 218, a false-positive discrepant work item can exist if one or more values of variables in the actual output work items 216 are modified in the operational data storage 218 before the actual output work items 216 is extracted by the data extractor 232. A false-positive discrepant work item indicates that the architecture of the business process 210 should be modified so that the data on which the analysis relies remains unchanged between storage and extraction. The discrepancy analysis 230 can be used on the actual controls 212 as long as the data input to and output from the actual controls 212 is available in the operational data storage 218.

The analysis engine 234 uses the rule audit trail to identify the root cause or causes of any discrepant work items and creates one or more reports 236. A root cause of a discrepant work item is a business rule that has input values that match corresponding values in the actual input work items 214 and output values that are different from corresponding values in the actual output work items 216. A root cause can be found by analyzing the rules that fired on a work item starting with the last rule that fired. The input and output values of that rule in the modeled controls 244 are compared to the corresponding values in the actual input work items 214 and actual output work items 216 to determine whether that rule was a root cause. If the last rule to fire was not a root cause of the discrepancy (that is, an input to the rule and an output from the rule both differ between the actual and modeled data), the last rule to modify an input value that differs (the penultimate rule) is examined. If the inputs to the penultimate rule are the same between the actual and modeled data, the penultimate rule is a root cause. If the inputs to the penultimate rule also differ, the last rule to modify the penultimate rule's input that differs is examined, and so on, until a root cause is found. If multiple inputs to a given rule differ, each last rule that modified any differing input is examined, and the discrepant work item may have more than one root cause. If the actual input work items 214 are not available in the discrepancy analysis 230, the modeled input work items 246 are used in their stead.

The reports 236 can include information about the compliance of work items processed by individual controls or groups of controls in the modeled controls 244, can present the results of the analysis for individual work items, and can aggregate the results of the analysis over several work items. The reports 236 allow a user to see what percentage of work items are discrepant. A user can determine patterns to discrepancies using the reports 236 and can identify the root cause or causes of the discrepancies by analyzing the results of the root-cause analysis. Once the root cause is identified, the user can determine whether the discrepant work item occurred because of problem with the business policy 220 or because of a problem with the execution of the business policy 220.

The discrepancy analysis 230 can be used to analyze historical data from the business process 210 when prompted by a user or at regular time intervals (e.g., hourly, daily, weekly, or monthly). Alternatively, the discrepancy analysis 230 can analyze the data from the business process 210 in near real time (e.g., every five seconds, or every transaction). The discrepancy analysis 230 can also analyze the data when a number of work items on which an actual business process has operated reaches a certain level (e.g., 100 work items).

Alerts 238 optionally are automatically generated based on the reports 236. The alerts 238 indicate, for example, when violations or warnings occur in the modeled controls 244. Violations or warnings occur when the logic of the business rules in the modeled controls 244 is incomplete or inconsistent (that is, when the business rules do not specify outputs for every possible input, or when they specify conflicting outputs for an input). The alerts 238 also can be generated when insufficient information is included in the actual output or input work items stored in the operational data storage 218. If insufficient information is included in the actual work items, the analysis engine 234 cannot compare one or more values in the modeled output work items 248 to the actual output work items 216 because the actual output work items 216 do not include corresponding values. The alerts 238 also can indicate when a specific work item is discrepant, or when more than a certain number or percentage of discrepant work items occur per unit time.

Using the reports 236, post-analysis action 250 can be performed to make the actual output work items 216 conform to the modeled output items 248 more closely. If the business process 210 is a source of differences between the actual output work items 216 and the modeled output items 248, the business process 210 can be modified. For example, the actual controls 212 can be modified by training employees, by training employees differently, or by changing the operation of automated controls. For some controls, an actual control can be replaced by a modeled control within the business process 210. The business process 210 can also be modified by changing the content of the actual input work items 214 (e.g., providing additional inputs to the actual controls 212). After the business process 210 is changed and new work items have been processed, the discrepancy analysis 230 can be used again, and the results of the new analysis are compared to those of the old analysis to observe the results of the change.

As a result of using the discrepancy analysis 230, it may be decided that the business policy 220 should be refined or redefined. If a certain rule is identified as the root cause of discrepant work items, the portion of the policy from which the rule was derived can be identified and reconsidered.

FIG. 3 and FIG. 4 describe a discrepancy analysis performed on an order management business process, and specifically on a business control that determines whether to approve or deny credit on an order. The policy document describes five rules associated with the "approve credit" control:

| Rule Number | Rule Statement |
| --- | --- |
| N.1 | Company's available credit is equal to credit limit minus credit outstanding. |
| 1 | If customer has a negative D&B rating (4-5), then do not approve credit on the order. |
| 2 | If customer has a good payment history (average DSOs <30), then approve credit on the order. |
| 3 | If customer has a positive D&B rating (1-3), and average DSOs >=30, then approve credit for orders not exceeding available credit. |
| 4 | If order total exceeds customer's available credit, then deny credit on the order. |

As shown in FIG. 3, part of the report from a discrepancy analysis includes details of data used and created in the analysis. FIG. 3 describes the actual and modeled output work items as relational tables. The business control being analyzed takes as input an order and an associated customer. The order and customer are represented as relational tables ("ORDER" and "CUSTOMER"), with a foreign key relating the tables.

The actual output work items from an actual business process are described in blocks 310 and 320, and the modeled output work items are described in blocks 330 and 340 and are generated from the execution of the modeled control. In block 330, three credit approval values (values 332, 334, and 336) in the modeled output work item differ from corresponding credit approval values (values 312, 314, and 316) in the actual output work item. Also, one "available_credit" value 342 in the "CUSTOMER_PEG" table of block 340 (part of the modeled output work item) differs from a corresponding "available_credit" value 322 in the "CUSTOMER" table of block 320 (part of the actual output work item).

As shown in FIG. 4, the report also includes a root-cause analysis 400 for the orders in FIG. 3 with discrepant output work items, where the results differed between the historical data values and values generated from the execution of the modeled control. The root-cause analysis 400 shows the last rule 410 that fired on order number "3." Examining the inputs 415 of the rule 410 shows that the actual and predicted (modeled) inputs were the same. The outputs 420 of the rule 410, however, were different. This indicates that rule 410 was the root cause of the difference in the credit approval decision.

The root-cause analysis 400 also shows two rules (rules 430 and 440) that fired on order number "5." The rule 430 is the last rule that fired on order number "5." The outputs 432 of the rule 430 were different between the historical and modeled data, and so were the inputs 434 of the rule 430. Because the inputs were not the same, the rule 430 is not the root cause of the difference in the output of the control for order number "5." The input to the rule 430 that differs between the historical and modeled data is the customer's available credit. The root-cause analysis 400 indicates that the last rule that modified the available credit was the rule 440. Examining the inputs 444 and outputs 442 of the rule 440 shows that the outputs 442 differed, while the inputs 444 were identical. Therefore, rule 440 was the root cause of the difference in the credit approval decision.

A discrepancy analysis can be used to analyze changes that would result from a contemplated change in a business policy. For example, a discrepancy analysis can compare the cost of historical purchases to what those purchases would have cost if a different business policy had governed the purchases. In this type of analysis, the modeled controls used in the discrepancy analysis are based on the proposed business policy rather than the actual policy that was in place when the purchases were made. For example, this type of discrepancy analysis is used to identify opportunities for savings that a change in a purchasing policy would provide. As shown in FIG. 5, a root-cause analysis 500 lists four rules (rules 510, 530, 550, 570) that fired when processing a modeled work item. The outputs 512 of the rule 510 indicate that a difference exists between a historical order total and the order total that would have resulted if an alternative business policy had governed the processing of the work item. Examining the inputs 514 of the rule 510 shows that the amounts of two of the three subtotals that were input to the rule 510 differed between the actual results and the results calculated using the modeled control.

The rule 530 has different output subtotals 532, but the same input subtotals 534. The rule statement ("Ordered non-contracted product has been replaced by 'Exact' or 'Functional Equivalent' product") indicates why savings were realized when the rule 530 was applied to the work item. Likewise, the rule 550 has different output subtotals 552 with the same input subtotal 554. No savings were realized by the firing of the rule 570. Key performance metrics 580 are included in root-cause analysis 500 to highlight the dollar savings that would apply if the new policy were utilized.

In addition to the reports shown in FIGS. 3-5, additional reports can be created from the analytical data storage 242 (FIG. 2), and the analytical data storage 242 can be analyzed in an ad-hoc manner using analysis tools.

In one implementation, a discrepancy analysis is performed repeatedly to monitor a business process with inputs whose state changes with time. For example, a business process to select an investment portfolio can include rules that constrain what percentage of the portfolio's total value can be invested in a particular business sector. The percentage of the portfolio's value that is invested in the particular sector fluctuates with time as the investments in the particular sector (and investments in other sectors) appreciate or depreciate in value. A discrepancy analysis can be run on the investment portfolio regularly (e.g., nightly) to determine whether the portfolio complies with the rules given the value of the portfolio's various investments when the discrepancy analysis is run. If the investment portfolio is no longer compliant (e.g., the percentage invested in the particular sector is too high or too low), a discrepant work item will occur when the discrepancy analysis is performed, and an alert can be generated. A portfolio manager can then reallocate the portfolio's investments to make the portfolio compliant.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention has been described in terms of particular embodiments. Other embodiments are within the scope of the following claims. For example, the steps of the invention can be performed in a different order and still achieve desirable results.

What is claimed is:

1. A system comprising:
one or more processors; and
a memory storing instructions, when executed by the one or more processor, to provide:
an analysis engine operable to compare one or more actual output work items generated by participants of an actual business process representing a business policy to one or more modeled output work items from one or more modeled business controls representing the business policy and to report differences between the one or more actual output work items and the one or more modeled output work items indicating how closely the actual business process adheres to the business policy, wherein:
each actual output work item includes one or more actual output data values, the actual business process changing an actual input work item into the actual output work item;
each modeled output work item includes one or more modeled output data values, the one or more modeled business controls executing on one or more modeled input work items and generating the one or more modeled output work items;
input data values included in each modeled input work item are determined from one of matching (1) corresponding values included in a corresponding actual input work item and (2) the corresponding actual output work item;
each modeled business control is defined by a set of business rules that represent the business policy, the analysis engine being operable to use the set of business rules to generate the one or more modeled output work items using the input data values of the one or more modeled input work items;
responsive to determining that one of the one or more actual output work items differs from a corresponding modeled output work item, the analysis engine creates a rule audit trail for identifying a root cause of a discrepant work item by analyzing the last business rule from the set of business rules that have been used to generate the corresponding modeled output work item, the discrepant work item indicating a difference between the one of the one or more actual output work items and the corresponding modeled output work item, the root cause including a business rule from the set of business rules, the root cause:
having input data values matching to the corresponding values included in the one of the one or more actual input work items;
having modeled output data values that are different from the corresponding values in the one of the one or more actual output work items; and
indicating that the discrepant work item is caused by one of: an incorrect execution of the business policy; and an incorrectness in the business policy.

2. The system of claim 1, wherein:
the rule audit trail records, for an individual modeled output work item, a sequence of modeled business controls that executed on an individual modeled input work item and a sequence of associated business rules that fired within the modeled business controls in the sequence of modeled business controls to generate the individual modeled output work item.

3. The system of claim 1, wherein:
the analysis engine is operable to compare the one or more actual output work items and the one or more modeled output work items in near real-time and generate an alert if a difference is found between the one or more actual output work items and the one or more modeled output work items.

4. The system of claim 1, wherein:
the analysis engine is operable to aggregate results of comparing the one or more actual output work items and the one or more modeled output work items to report the differences.

5. The system of claim 1, wherein:
the analysis engine is operable to generate an alert when a discrepant work item occurs.

6. The system of claim 1, wherein:
the analysis engine is operable to compare the one or more actual output work items to one or more updated modeled output work items from one or more updated modeled business controls and report a change caused by using the one or more updated modeled business controls in place of the one or more modeled business controls.

7. The system of claim 1, wherein:
an analytical data storage database stores each modeled input work item and each modeled output work item, and the analytical data storage database is constructed automatically based upon a data model used to define the one or more modeled business controls.

8. The system of claim 1, wherein:
a data model is used to construct the one or more modeled business controls, and the data model is constructed automatically based upon an operational data model used within an operational data storage that stores each actual output work item and each actual input work item.

9. The system of claim 1, wherein:
the analysis engine is operable to generate an alert if the set of business rules that defines one of the modeled business controls is incomplete or inconsistent.

10. The system of claim 1, wherein:
the analysis engine is operable to generate an alert if one of the actual output work items does not include any actual output data value that corresponds to a modeled output data value included in one of the modeled output work items.

11. The system of claim 2, wherein:
the rule audit trail also records a set of data values input to each business rule that fired and a set of data values output from each business rule that fired.

12. The system of claim 2, wherein:
the root cause causes a difference between the individual modeled output work item and the corresponding actual output work item.

13. A system comprising:
one or more processors and
a memory storing instructions, when executed by the one or more processor, to perform operations including:
comparing one or more actual output work items generated by participants of an actual business process representing a business policy to one or more modeled output work items from a modeled business process representing the business policy to determine how closely the actual business process adheres to the business policy; and
reporting differences between the one or more actual output work items and the one or more modeled output work items, wherein:
each actual output work item includes one or more actual output data values, the actual business process changing an actual input work item into the actual output work item;
each modeled output work item includes one or more modeled output data values, the modeled business process operating on one or more modeled input work items and generating the one or more modeled output work items;
input data values included in each modeled input work item are determined from one of matching (1) corresponding values included in a corresponding actual input work item and (2) the corresponding actual output work item;
the modeled business process includes one or more modeled business controls, each modeled business control corresponding to an actual business control included in the actual business process;
each modeled business control is defined by a set of business rules that represent the business policy, the means for comparing being operable to use the set of business rules to generate the one or more modeled output work item using the input data values of the one or more modeled input work items; and
responsive to determining that one of the one or more actual output work items differs from a corresponding modeled output work item, creating a rule audit trail for identifying a root cause of a discrepant work item by analyzing the last business rule from the set of business rules that have been used to generate the corresponding modeled output work item, the discrepant work item indicating a difference between the one of the one or more actual output work items and the corresponding modeled output work item, the root cause including a business rule from the set of business rules, the root cause:
having input data values matching to the corresponding values included in the one of the one or more actual input work item;
having modeled output data values that are different from the corresponding values in the one of the one or more actual output work items; and
indicating that the discrepant work item is caused by one of: an incorrect execution of the business policy; and an incorrectness in the business policy.

14. The system of claim 13, wherein:
the rule audit trail records, for an individual modeled output work item, a sequence of modeled business controls that executed on an individual modeled input work item and a sequence of associated business rules that fired within the modeled business controls in the sequence of modeled business controls to generate the individual modeled output work item.

15. A method comprising:
executing, using one or more processors, one or more modeled business controls on a modeled input work item to generate a corresponding modeled output work item, wherein input data values included in the modeled input work item are determined from one of matching (1) corresponding values included in a corresponding actual input work item and (2) the corresponding actual output work item, each modeled business control is defined by a set of business rules that represent a business policy, and executing the one or more modeled business controls includes using the set of business rules and the input data values of the modeled input work item to generate the modeled output work item;
comparing an actual output work item from an actual business process representing the business policy to the modeled output work item from the one or more modeled business controls representing the business policy, wherein the actual output work item includes one or more actual output data values, the actual business process changes the actual input work item into the actual output work item, and the modeled output work item includes one or more modeled output data values;
reporting differences between the actual output work item and the modeled output work item indicating how closely the actual business process adheres to the business policy; and
responsive to determining that one of the one or more actual output work items differs from a corresponding modeled output work item, creating a rule audit trail for identifying a root cause of a discrepant work item by analyzing the last business rule from the set of business rules that have been used to generate the corresponding modeled output work item, the discrepant work item indicating a difference between the one of the one or more actual output work items and the corresponding modeled output work item, the root cause including a business rule from the set of business rules, the root cause:
having input data values matching to the corresponding values included in the one of the one or more actual input work items;
having modeled output data values that are different from the corresponding values in the one of the one or more actual output work items; and
indicating that the discrepant work item is caused by one of: an incorrect execution of the business policy; and an incorrectness in the business policy.

16. The method of claim 15, wherein:
the rule audit trail records, for the modeled output work item, a sequence of the modeled business controls that executed on the modeled input work item and a sequence of the business rules that fired within the modeled business controls to generate the modeled output work item.

17. The method of claim 16, further comprising:
recording a set of data values input to each business rule that fired and a set of data values output from each business rule that fired.

18. The method of claim 16, wherein:
the root cause causes a difference between the individual modeled output work item and the actual output work item.

19. The method of claim 15, further comprising:
comparing the actual output work item to an updated modeled output work item from one or more updated modeled business controls; and
reporting a change caused by using the one or more updated modeled business controls in place of the one or more modeled business controls.

20. The method of claim 15, further comprising:
creating the set of business rules by modeling logic of the business policy.

21. A computer program product, tangibly embodied in a machine-readable storage device, the computer program product comprising instructions operable to cause a data processing apparatus to perform the operations of:
executing one or more modeled business controls on a modeled input work item to generate a corresponding modeled output work item, wherein input data values included in the modeled input work item are determined from one of matching (1) corresponding values included in a corresponding actual input work item and (2) the corresponding actual output work item, each modeled business control is defined by a set of business rules that represent a business policy, and executing the one or more modeled business controls includes using the set of business rules and the input data values of the modeled input work item to generate the modeled output work item;
comparing an actual output work item from an actual business process representing the business policy to the modeled output work item from the modeled business controls representing the business policy, wherein the actual output work item includes one or more actual output data values, the actual business process changes the actual input work item into the actual output work item, and the modeled output work item includes one or more modeled output data values;
reporting differences between the actual output work item and the modeled output work item, the differences indicating differences between the actual business process and the business policy; and
responsive to determining that one of the one or more actual output work items differs from a corresponding modeled output work item, creating a rule audit trail for identifying a root cause of a discrepant work item by analyzing the last business rule from the set of business rules that have been used to generate the corresponding modeled output work item, the discrepant work item indicating a difference between the one of the one or more actual output work items and the corresponding modeled output work item, the root cause including a business rule from the set of business rules, the root cause:
having input data values matching to the corresponding values included in the one of the one or more actual input work items;
having modeled output data values that are different from the corresponding values in the one of the one or more actual output work items; and
indicating that the discrepant work item is caused by one of: an incorrect execution of the business policy; and an incorrectness in the business policy.

22. The computer program product of claim 21, wherein:
the rule audit trail records, for the modeled output work item, a sequence of the modeled business controls that executed on the modeled input work item and a sequence of the business rules that fired within the modeled business controls to generate the modeled output work item.

23. The computer program product of claim 22, further comprising instructions operable to cause a data processing apparatus to perform the operation of:
recording a set of data values input to each business rule that fired and a set of data values output from each business rule that fired.

24. The computer program product of claim 22, wherein:
the root cause causes a difference between the individual modeled output work item and the actual output work item.

25. The computer program product of claim 21, further comprising instructions operable to cause a data processing apparatus to perform the operations of:
comparing the actual output work item to an updated modeled output work item from one or more updated modeled business controls; and
reporting a change caused by using the one or more updated modeled business controls in place of the one or more modeled business controls.

26. A system for comparing outputs of internal business controls to outputs of business controls modeling a policy, the system comprising:
one or more processors and
a memory storing instructions, when executed by the one or more processor, to provide:
an analysis engine operable to compare one or more actual output work items generated from participants of one or more actual business controls in an actual business process representing a business policy to one or more modeled output work items from one or more modeled business controls representing the business policy, wherein:
each actual output work item includes a set of variables, each variable storing one or more values, the one or more actual business controls executing on and changing an actual input work item into the actual output work item;
each modeled output work item includes a set of variables, each variable storing one or more values, the one or more modeled business controls executing on and changing a modeled input work item into the modeled output work item;
each actual business control is executed by an existing system or manually by one or more people, and each modeled business control is executed by a rule engine;
each modeled business control includes a set of business rules that describe a desired logic for the modeled business control, the set of business rules operable to transform the modeled input work item into the modeled output work item;
each business rule in the set of business rules is associated with a policy source and a motivation;
each modeled input work item is extracted from operational data stores that store the one or more actual output work items;
each modeled input work item is determined from one of matching (1) a corresponding actual input work item and (2) the corresponding actual output work item;
the one or more modeled business controls each fire one or more business rules from the set of business rules included in the respective modeled business control;
the analysis engine creates a rule audit trail and stores the rule audit trail in an analytical data store, the rule audit trail recording, for an individual modeled output work item, a sequence of modeled business controls and associated business rules that fired against a corresponding modeled input work item, a set of variable inputs to each business rule that fired, and a set of variable outputs from each business rule that fired;

the analysis engine uses the rule audit trails to identify any differences between the actual output work items and corresponding modeled output work items indicating how closely the actual business process adheres to the business policy; and for any difference between the actual output work items and the corresponding modeled output work items, the analysis engine uses the rule audit trails to identify a root cause of a discrepant work item by analyzing the last business rule from the set of business rules that have been used to generate the corresponding modeled output work item, the discrepant work item indicating a difference between the one of the one or more actual output work items and the corresponding modeled output work item and generates reports, the root cause including a business rule from the set of business rules:

having input data values matching to the corresponding values included in the one of the one or more actual input work items;

having modeled output data values that are different from the corresponding values in the one of the one or more actual output work items; and indicating that the discrepant work item is caused by one of: an incorrect execution of the business policy; and an incorrectness in the business policy.

27. The system of claim 26, wherein:

the desired logic for each modeled business control is derived from the policy;

the policy is an existing policy; and any differences between the actual output work items and the corresponding modeled output work items are discrepancies between the policy and an execution of the policy.

28. The system of claim 26, wherein:

the desired logic for each modeled business control is derived from the policy;

the policy is a proposed new policy; and any differences between the actual output work items and the corresponding modeled output work items reflect the effects of changing from an existing policy to the proposed new policy.

* * * * *